Patented Nov. 11, 1947

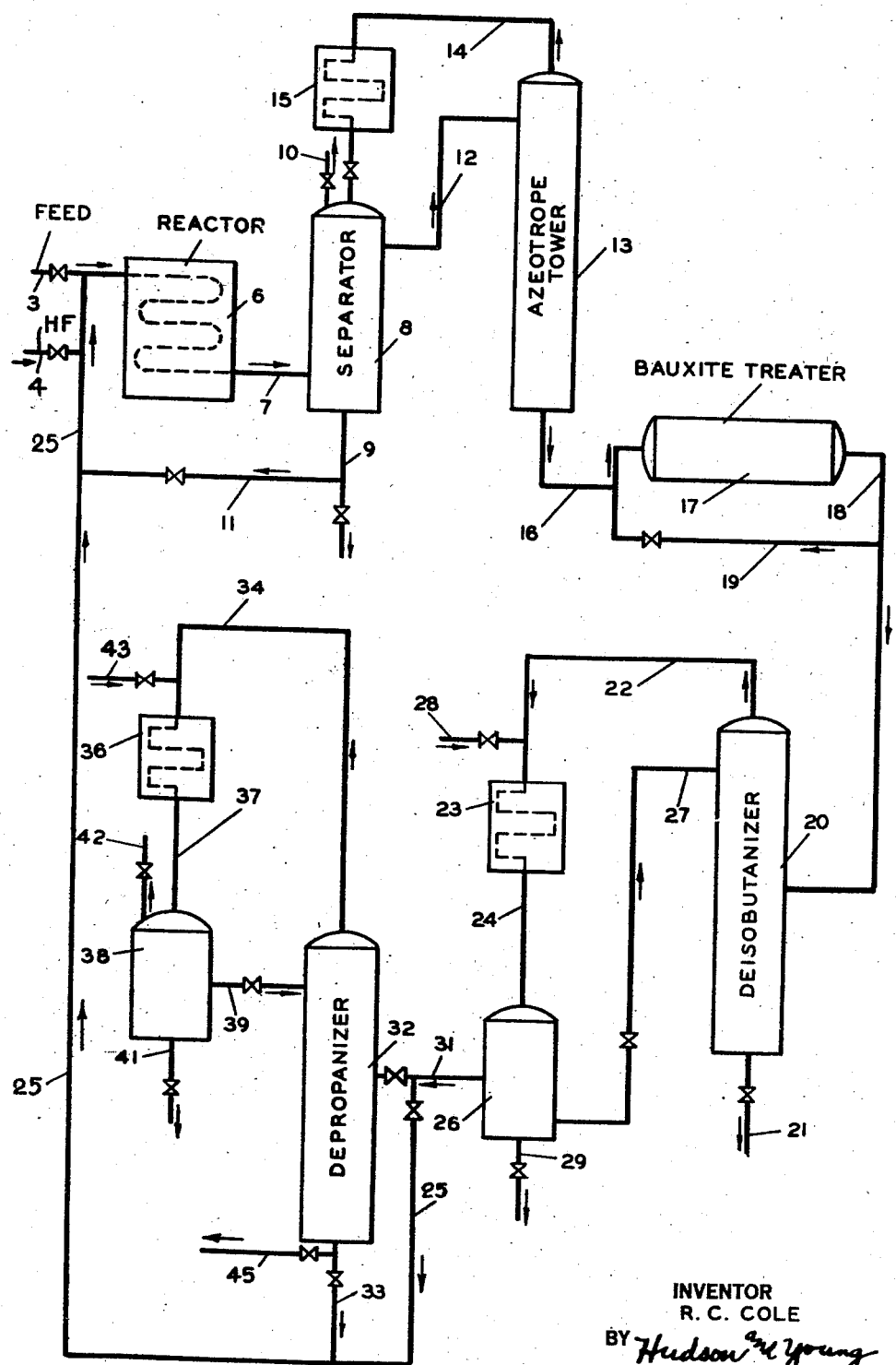

2,430,453

UNITED STATES PATENT OFFICE 2,430,453

PREVENTION OF SILICEOUS DEPOSITS IN FLUORINE-CONTAINING CATALYST HYDROCARBON CONVERSIONS

Ralph C. Cole, Phillips, Tex., assignor to Phillips Petroleum Company, a corporation of Delaware Application January 26, 1945, Serial No. 574,760

10 Claims. (Cl. 260—683.4)

1

This invention relates to the treatment of hydrocarbon materials. In one particular embodiment this invention relates to the removal and prevention of siliceous deposits which may accumulate in condensers used in the fractionation of hydrocarbons. In a particular aspect this invention relates to the removal of siliceous deposits formed in connection with the conversion of hydrocarbons in the presence of fluorine-containing catalysts.

In the manufacture of hydrocarbons by processes in which fluorine-containing catalysts are used, small proportions of organic fluorine-containing by-products are formed. These processes may involve reactions such as polymerization and alkylation of relatively low-boiling hydrocarbons to produce motor-fuel hydrocarbons in the presence of catalysts comprising one or more of such fluorine compounds as hydrofluoric acid, boron trifluoride, and the like. Although the exact nature or composition of the organic fluorine-containing by-products which may be formed has not been definitely established, they are believed to be predominantly alkyl and/or aryl fluorides. They are not completely removed by washing the hydrocarbons with alkali solutions. They tend to decompose at elevated temperatures, such as those employed in fractional distillation of the hydrocarbons, thereby forming hydrofluoric acid, which is corrosive, especially in the presence of moisture. In gases, they may thus cause corrosion of handling equipment; in liquid motor-fuel hydrocarbons, they are undesirable for reasons that are obvious.

As discussed in Frey Patent 2,347,945, issued May 2, 1944, such organic fluorine compounds may be removed from hydrocarbon materials containing them by contacting such a hydrocarbon material with any one of a number of solid porous contact materials. Contact materials which have been found suitable include those known to be catalytically active for hydrogenation and dehydrogenation reactions such as alumina gel, activated alumina, dehydrated bauxite, chromium oxide, mixtures of alumina and chromium oxide, chromium ores comprising chromium oxide and ores of related materials such as those containing zirconia, limestone, magnesia, and the like. Such contact materials appear to adsorb preferentially the organic fluorine compounds although the exact mechanism involved is not known at present. Materials which contain large quantities of silicon dioxide or of various naturally occurring silicates are generally not suitable for such treatment, but many of the naturally occurring ores

2 which can be so used contain appreciable amounts of silica or silicates. One such material which has found wide commercial use is hard granular bauxite. Such bauxite has a variable composition, which may be exemplified by the following typical analysis, in per cent by weight:

| | |
|---|---|
| Al$_2$O$_3$ | 77.5 |
| SiO$_2$ | 9.4 |
| TiO$_2$ | 3.4 |
| Fe$_2$O$_3$ | 6.0 |
| H$_2$O | 1.7 |
| V. M. | 2.0 |
| Total | 100.0 |

The presence of silica is undesirable because it causes the formation of silicon tetrafluoride. Nevertheless, in practice bauxite containing up to 15 and even 20 per cent of silica has been used, in the absence of any alternative readily available and economical material. When the bauxite has become partially spent for such use and/or when the hydrocarbon material being treated is passed through the mass of contact agent at a high flow rate, it has been found that silicon tetrafluoride is present in the effluent; also, some water, which appears to be formed by reaction of the fluorine compounds with the bauxite, is present in the effluent.

That is, after conversion of the hydrocarbons, either in the liquid or vapor phase, in the presence of fluorine-containing catalysts, such as hydrogen fluoride, boron trifluoride, or the like, silicon tetrafluoride is formed when the hydrocarbon conversion effluent is contacted with contact materials containing minor proportions of silica. It is necessary, in most cases, to contact the hydrocarbon effluent with a contact material to remove the organic fluorine compounds; in this treatment silicon tetrafluoride and water are liberated by the reaction of hydrogen fluoride or the organic fluorine compounds with silica present as an impurity in the contact material. Typical equations of reactions which may occur in the treatment of the effluent with bauxite are:

$$6RCH_2CH_2F + Al_2O_3 \rightarrow 6RCH=CH_2 + 2AlF_3 + 3H_2O$$
$$4RCH_2CH_2F + SiO_2 \rightarrow 4RCH=CH_2 + SiF_4 + 2H_2O$$
$$SiO_2 + 4HF \rightarrow 2H_2O + SiF_4$$

Although bauxite has been referred to in particular, this invention may apply to any type of contact material suitable for the adsorptions of organic fluorine compounds in which minor proportions of silica are present. After being formed, the water and the silicon tetrafluoride are conveyed along with the hydrocarbon effluent to subsequent treating equipment, which is usually fractionating equipment, and accumulate in the overhead fractions from the fractionators.

In consequence, trouble is experienced in the subsequent treating equipment as a result of the silicon tetrafluoride reacting with water to form various siliceous solid deposits. When the effluent of the bauxite treating step just discussed is in the liquid phase, and the proportions of silicon tetrafluoride and water are so small that these materials are completely dissolved, relatively little or only minor trouble may be experienced, if any. However, when much of the hydrocarbon material has been removed by fractional distillation so that the concentrations of the silicon tetrafluoride and the water are increased, and especially when the temperature is so low that free liquid water separates from the hydrocarbon mixture, the silicon tetrafluoride reacts with the water, forming siliceous solids that accumulate, thereby partially or completely plugging equipment and necessitating an expensive shut-down and interruption of production for the purpose of removing the siliceous deposits. Sometimes the deposits form in the condenser of the first fractionator, such as the deisobutanizer; sometimes the deposits may not form until the effluent has reached the condenser of the second fractionator, such as a depropanizer; sometimes the deposits form in the condensers of all the fractionators. The deposits appear to vary with the proportions of water and silicon tetrafluoride in the hydrocarbon stream; and these proportions in turn vary with such factors as the degree of spending of the bauxite. Apparently, the deposition is favored markedly by increase in the water content of the hydrocarbon stream, and it is thought that only minor hydrolysis of silicon tetrafluoride occurs when the hydrocarbon stream is less than 35 per cent saturated with water.

The amount of organic fluorine present in the charge to the bauxite treating step for the removal of fluorine compounds generally is not more than about 0.1 per cent by weight and often is not more than 0.001 to 0.05 per cent by weight. Most of this organic fluorine is retained by the treating agent, and the silicon tetrafluoride in the effluent from this treating step generally is less than about 0.01 per cent by weight, and often it is less than 0.0005 per cent by weight. Nevertheless, in commercial plants, wherein several hundred barrels of hydrocarbons are treated per day and the silicon tetrafluoride reacts with water to form solid siliceous deposits in one specific spot, such as the condenser and accumulator of a deisobutanizer or a depropanizer, the amount of solid siliceous material accumulated over a period of a few weeks or a few months amounts to a very substantial total.

An object of the present invention is to provide a process for the removal and prevention of siliceous deposits in condensers of fractionating equipment used in connection with the conversion of hydrocarbons.

It is also an object to prevent the plugging of condensers and tubing wherein siliceous deposits are accumulated.

Another object is to prevent the corrosion of fractionating equipment caused by the liberation of acids in the condensers and tubing of the fractionating equipment.

Still another object is to provide a means for the separation of silicon tetrafluoride from a hydrocarbon mixture.

Other objects and advantages will appear obvious to those skilled in the art from the accompanying disclosure and description.

According to this invention, siliceous deposits in condensers of fractionating columns used in hydrocarbon conversion processes are removed and/or prevented by introduction of water into the vaporous hydrocarbon streams entering the condensers, or into the condensers themselves. The amount of water necessary to remove the siliceous deposits at any particular place depends primarily on the amount of silicon tetrafluoride contained in the hydrocarbon stream. Calculations from analytical data indicate that, in a certain commercial alkylation plant, normally between 15 and 80 pounds of silicon tetrafluoride is liberated from the bauxite per day, but occasionally it reaches 350 pounds per day. In practice, the amount of wash water used has been usually in the range of 190 to 360 barrels per day, but it may be outside this range, as circumstances warrant. As a rule, the amount of water to be preferred is from 1 to 4 barrels per pound of silicon tetrafluoride, but the optimum amount varies with such factors as the extent of spending of the bauxite, the rate of hydrocarbon flow, the content of organic fluorine, the size and the type of condensers, and the like; the optimum amount can be readily determined for any particular set of factors by trial. The water carrying the siliceous materials which may accumulate therein is separated and removed from the liquefied hydrocarbon stream leaving the condenser.

The following equations are illustrative of reactions involved in the hydrolysis of silicon tetrafluoride:

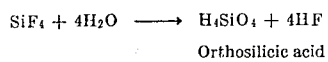

Orthosilicic acid

Metasilicic acid

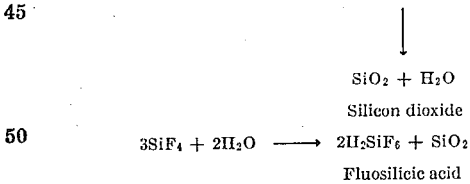

Silicon dioxide

Fluosilicic acid

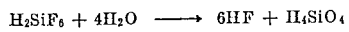

The formation of orthosilicic acid results in a gel-type deposit which tends to accumulate and plug the condenser tubing and reflux pipes and valves. Under appropriate conditions orthosilicic acid decomposes to metasilicic acid or silicon dioxide, which are precipitates and which also obstruct the passage of hydrocarbons through the condensers and tubings of the fractionating equipment. The silicic acids and silicon dioxide are moderately soluble in water but have practically no solubility in the hydrocarbon material. Fluosilicic acid is soluble in water and is substantially electrolytic; consequently it is relatively corrosive to the metal tubing and equipment of the fractionator. The hydrogen fluoride liberated in the hydrolysis of silicon tetrafluoride and of fluosilicic acid is also corrosive to the equipment in the presence of water. It is, therefore, much to be desired to remove these deposits and corrosive materials as quickly as possible from the fractionating equipment.

According to this invention such deposits and corrosive materials are removed or prevented from forming by a continuous controlled water wash and draw-off. In one embodiment, the water is preferably injected into the hydrocarbon vapor line ahead of the point at which the deposits are formed in the absence of such treatment, such as before the vaporous stream of hydrocarbons enters the condenser of a fractionating column. The quantity of water injected is usually in excess of that which will be vaporized by the hot hydrocarbon vapors. The excess water prevents precipitation of solid hydrolysis products on the uppermost tubes in the condenser by a washing action or by a solution effect on the products. The water also hydrolyzes substantially all of the silicon tetrafluoride in the hydrocarbon stream at this point and thereby prevents a carry-over of the silicon tetrafluoride to subsequent fractionating columns or to the return reflux conduit. The water, after passing through and washing those portions of the equipment where deposits tend to be formed, accumulates or is withdrawn in an appropriate manner so as to remove all of the hydrolysis products. In the case of injecting the water into the condenser the water is accumulated in the reflux accumulator and is withdrawn at a rate sufficient to prevent accumulation of hydrolysis products within the accumulator.

Since certain of the hydrolysis products, such as hydrogen fluoride and fluosilicic acid are acidic and corrosive, sufficient water is normally injected to control the pH, or the hydrogen ion concentration, of the effluent water within the relatively noncorrosive ranges. It is, therefore, preferable to have the injection water at a pH of about 8 to about 9 and water within a pH range of about 6 to about 10 may be used under proper conditions. Natural water with a pH of about 8, or slightly higher, and preferably containing no temporary hardness, may be used. Where such natural basic water is not available or where it is more desirable to control the pH by other methods, ammonia may be injected simultaneously with the water in sufficient quantity to control the pH of the effluent water, as desired. The water may also be made basic, so as to neutralize the acids, prior to its injection into the hydrocarbon stream by other methods as well as by adding ammonia, as by addition of an alkali or an alkali salt.

The drawing represents diagrammatically one arrangement of apparatus in which one embodiment of the present invention may be practiced. This embodiment includes a liquid-phase alkylation of hydrocarbons in which hydrogen fluoride is used as the catalyst. The hydrocarbon feed, comprising a mixture of low-boiling isoparaffins and olefins, enters reactor 6 through line 3. Any desired type of reaction chamber or series of chambers may be employed without departing from this invention. Hydrogen fluoride catalyst is introduced through lines 4 and 25 to reactor 6. Alkylation of the hydrocarbons is accomplished under known conditions of pressure, temperature, and residence time in reactor 6. The effluent therefrom passes through line 7 into separator 8, in which it separates into two liquid phases, a hydrocarbon phase and a hydrogen fluoride phase. The hydrogen fluoride phase is withdrawn from separator 8 through line 9 for purification (not shown) as desired, or may be recycled as catalyst through line 11 to line 25 for reintroduction into reactor 6. The hydrocarbon phase, containing some dissolved hydrogen fluoride, passes from separator 8 to azeotrope tower 13 by line 12. Separation of a more or less azeotropic mixture of hydrocarbons and hydrogen fluoride is effected in fractionation tower 13. This mixture passes as a vapor from tower 13 through line 14 and condenser 15 to separator 8. A liquid hydrocarbon stream, substantially free from hydrogen fluoride but containing organic fluorine compounds, passes from the bottom of tower 13 through line 16 to treater 17. These organic fluorine compounds, which are formed as by-products of the hydrocarbon conversion, are removed by treatment with a suitable agent, such as bauxite or alumina in treater 17. When siliceous material, such as silica or various natural silicates, is present in the treating material, silicon tetrafluoride and water may be formed and will appear in the effluent when the treating agent is partially spent and/or when an economically desirable high flow rate is used. Water formed during defluorination is generally present in the resulting effluent in an amount less than that required to saturate the liquid effluent, i. e., less than about one per cent by weight; while silicon tetraufloride is usually present in an amount less than about 0.01 per cent by weight.

The effluent, now substantially free from organic fluorine compounds but containing silicon tetrafluoride and water as impurities, passes to de-isobutanizer 20 by line 18. In most cases this stream is completely in the liquid phase and contains such relatively small proportions of silicon tetrafluoride and of water that these impurities are completely dissolved in the liquid phase. A portion of this stream may be recycled to the bauxite treater through line 19 if desired, although this is not essential. Normal butane and heavier hydrocarbons are separated from isobutane and lighter hydrocarbons in deisobutanizer 20, which is a fractionating column complete with condenser 23 and accumulator 26, and are withdrawn from deisobutanizer 20 by line 21. If desired, the butane and heavier hydrocarbons are conveyed to subsequent fractionators and process equipment (not shown) for separation of the butane and alkylation products; also, a portion of the butane and heavier hydrocarbons from deisobutanizer 20 may be recycled to reactor 6. The overhead product from deisobutanizer 20, comprising isobutane and lighter hydrocarbons, passes therefrom through line 22, condenser 23, and line 24 into accumulator 26. Vaporous hydrocarbons are condensed in condenser 23 and accumulate as a liquid in accumulator 26. A portion of the liquid hydrocarbons from accumulator 26 is returned through line 27 to deisobutanizer 20 as reflux.

If conditions of temperature and pressure within accumulator 26 and condenser 23 are such that particularly the solubility of the water in the hydrocarbon is decreased sufficiently to form a separate liquid water phase, siliceous deposits accumulate in condenser 23 and accumulator 26, and sometimes in line 27 and subsequent fractionating equipment through which the hydrocarbon stream is passed. In order to remove the siliceous deposits according to this invention, water is injected into the hydrocarbon stream, preferably at the point shown by line 28, in sufficient proportion to wash the condenser and to remove the siliceous deposits therefrom. The proportion of water is usually preferably within the range of 1 to 4 barrels of water per pound of silicon tetrafluoride in the hydrocarbon stream at this point, but smaller or larger proportions may be adequate or necessary in particular instances. It may be sufficient in some cases to inject the water directly into accumulator 26. The water and condensed hydrocarbons flow from condenser 23 through line 24 into accumulator 26. The water which contains entrained or dissolved siliceous deposits is withdrawn through line 29. Obviously, water may be injected at any effective point and in any effective manner without departing from the scope of this invention.

At least a portion, and ordinarily all, of the overhead product from deisobutanizer 20 passes from accumulator 26 into depropanizer 32 by line 31 for separation of isobutane from propane and lighter hydrocarbons. Isobutane, which is incidentally dried as a result of the depropanization, is removed from the bottom of depropanizer 32 and may be withdrawn through line 45 or recycled by lines 33 and 25 to reactor 6, as circumstances may require. The overhead fraction comprising propane and lighter hydrocarbons from depropanizer 32 passes to condenser 36 through line 34. From condenser 36 the condensed hydrocarbons and vapors pass to accumulator 38 through line 37. Some of the liquid hydrocarbon is returned to depropanizer 32 through line 39 as reflux. Propane and other light hydrocarbons are withdrawn from accumulator 38 through line 42. If desired, part or even all of the overhead product from deisobutanizer 20 may be recycled to reactor 6, as by passing from accumulator 26 through lines 31 and 25, particularly when the proportion of propane and lighter hydrocarbons is relatively small; in such case, a drier should be provided to remove water from this recycled part.

Frequently in the operation of alkylation processes the accumulation of siliceous deposits in the condenser and tubing of the depropanizing equipment becomes so serious as to curtail the capacity thereof. In turn, because of the resultant insufficient removal of propane and lighter gases, continuation of the operation necessitates resorting to increased venting of such gases by 10 from separator 8 in order to maintain a pressure within the operating limits. This extra venting adversely affects the operation by increased hydrogen fluoride consumption and the loss of valuable iso- and normal butanes. Usually the most serious accumulation and formation of siliceous deposits is ordinarily observed in the depropanizing equipment, wherein the conditions of temperature and pressure and water concentration are more often such as to form a separate water phase in the condenser, accumulator, and even on some of the fractionating plates of depropanizing column 32. Therefore, according to a specific embodiment of this invention, water should be injected at this location to remove and prevent the siliceous deposits from forming.

Water is injected through line 43 preceding condenser 36. Water and hydrocarbons pass from condenser 36 through line 37 into accumulator 38, and the water is withdrawn from accumulator 38 by line 41.

As previously discussed, the pH of the wash water may be adjusted so that the acidity of the effluent wash water will be in the noncorrosive range, as by using a naturally basic water or by using chemicals to adjust the basicity of the water.

The injection of water into the hydrocarbon stream not only washes and removes the siliceous deposits but also substantially removes all of the silicon tetrafluoride in the hydrocarbon stream. In normal practice some of the silicon tetrafluoride would be recycled to the fractionator with the reflux and, if water is present in the reflux or on the plates of the fractionating tower, siliceous deposits form in the tower itself. Often this is evidenced by siliceous deposits on the top fractionating plate and by deposits in decreasing amounts on succeeding plates down the tower. By a substantially complete removal of the silicon tetrafluoride none can be recycled through the reflux, and thus the elimination or at least minimization of siliceous deposits in the tower itself is accomplished. Complete removal of silicon tetrafluoride from the hydrocarbon stream also prevents the carry-over and the formation of further deposits in subsequent equipment.

In case deposits are noticed in both deisobutanizing and depropanizing equipment, water may be injected, as previously described, in both places. The injection is preferably continuous; intermittent injection is also effective, but requires relatively more frequent inspections and control changes.

The present invention may be applied in many processes in which silicon tetrafluoride is present and in which it hydrolyzes, owing to the presence of water, to form siliceous deposits. Although specific data contained herein relate to hydrocarbon conversion processes, the present invention is not limited or restricted to such processes in its broadest aspects; it is also not restricted in all instances to the source of the silicon tetrafluoride or to the location of the siliceous deposits.

*Example*

In a plant for the reaction of isobutane with butylenes under alkylation conditions in the presence of a concentrated liquid hydrofluoric acid catalyst, effluents of the reactor were separated into a liquid hydrocarbon phase and a liquid acid phase. Dissolved hydrofluoric acid was removed from the hydrocarbon phase, and the resulting mixture, which contained minor amounts of organic fluorine compounds, was passed through a bed of granular hard bauxite. This bauxite contained some silica, and had a composition substantially the same as that presented hereinbefore. The hydrocarbon mixture so treated had about the following composition.

| Hydrocarbon Components | Per Cent Composition |
| --- | --- |
| Propane and Lighter | 0.4 |
| Isobutane | 53.4 |
| Normal Butane | 31.2 |
| Alkylate | 15.0 |

This mixture, after being treated at about 180° F. in liquid phase by passage through the bed of bauxite, was charged to a deisobutanizer at a rate of about 950 barrels per hour. This hydrocarbon stream, as charged to the deisobutanizer, contained silicon tetrafluoride to the extent of about 0.0003 to 0.0015% by weight. During the fractionation in the deisobutanizer, this silicon tetrafluoride was concentrated in the overhead fraction from the column and passed to the condenser and accumulator of the deisobutanizer. The hydrocarbon overhead stream contained sufficient water resulting from the defluorinating action on the organic fluorine compounds by the bauxite to hydrolyze some silicon tetrafluoride during the condensation of the vapors in the condenser. In time the resulting solid hydrolysis products, mainly hydrates of silica, obstructed the condenser tubing and reflux conduits to such an extent as to impair the operation of the deisobutanizer. In order to relieve the obstruction caused by the siliceous deposits and to prevent their formation, 8 to 15 bbls. per hour of water was injected into the vapor hydrocarbon stream just before it entered the condenser. The water collected as a separate phase in the accumulator of the deisobutanizer, wherefrom it was withdrawn at a continuous rate, maintaining constant level of water in the accumulator. The pH of the water injected into the hydrocarbon stream was adjusted to between 8 and 9 by the addition of ammonia. Thus the alkalinity of the water was sufficient at the above-mentioned hydrocarbon rate of flow to control the pH of the effluent water within a noncorrosive range. As a result of the water wash, all the deposits were removed thus alleviating the obstruction to the free flow of the hydrocarbons. The appearance of deposits in subsequent equipment was also substantially diminished.

Having described a preferred form of the invention and having pointed out the principal considerations to be observed in its operation, and in operation of equivalent systems, it is obvious that various other changes can be made without departing from the scope of the invention.

I claim:

1. In a process involving the alkylation of isobutane in the presence of a hydrofluoric acid alkylation catalyst in which a liquid hydrocarbon conversion effluent is contacted with bauxite containing minor proportions of silica to remove organic fluorine compounds formed during said conversion and thereby is contaminated with water which is present in an amount less than about 1 per cent by weight and with silicon tetrafluoride which is present in an amount less than about 0.01 per cent by weight, and in which butane and heavier hydrocarbons and propane and lighter hydrocarbons are separated from a resulting hydrocarbon effluent by fractional distillation under conditions such that said silicon tetrafluoride is hydrolyzed to form siliceous deposits during condensation of an overhead fraction from said fractional distillation, the method for removing said siliceous deposits which comprises injecting water directly into said overhead fraction during said condensation in an amount of about 1 to about 4 barrels of water per pound of silicon tetrafluoride present therein, maintaining the pH of said water within a range of about 8 to about 9 prior to the introduction into said fraction, and withdrawing water therefrom containing said siliceous deposits.

2. In a process comprising the alkylation of paraffins with olefins in the presence of a fluorine-containing alkylation catalyst, the contacting of an alkylation hydrocarbon effluent containing organic fluorine compounds with a contact material containing minor proportions of silica for the purpose of removing said organic fluorine compounds under conditions such that silicon tetrafluoride contaminates a resulting hydrocarbon effluent in an amount less than about 0.01 per cent by weight, and the fractional distillation of said resulting effluent under conditions such that said silicon tetrafluoride forms siliceous deposits in an overhead fraction from said fractional distillation, the method for removing said siliceous deposits which comprises introducing water directly into said overhead fraction from said fractional distillation in an amount sufficient to remove said siliceous deposits, and discharging water containing siliceous deposits therein.

3. In a process involving the conversion of hydrocarbons in the presence of a flourine-containing catalyst in which a liquid hydrocarbon conversion effluent is contacted with an organic fluorine-removing material containing minor proportions of silica and thereby is contaminated with water which is present in an amount less than about 1 per cent by weight and with silicon tetrafluoride which is present in an amount less than about 0.01 per cent by weight and in which components of a resulting hydrocarbon effluent are separated by fractional distillation under conditions such that said silicon tetrafluoride is hydrolyzed to form siliceous deposits by the condensation of a relatively low-boiling fraction from said fractional distillation, the method for removing said siliceous deposits which comprises introducing water directly into said relatively low-boiling fraction in an amount of about 1 to about 4 barrels of water per pound of silicon tetrafluoride present therein, maintaining the pH of said water within a range of about 8 to about 9 prior to introduction into said fraction, and withdrawing water containing siliceous deposits therein.

4. In a process involving the conversion of hydrocarbons in the presence of a fluorine-containing catalyst in which a liquid hydrocarbon conversion effluent is contacted with an organic fluorine-removing material containing minor proportions of silica and thereby is contaminated with water which is present in an amount less than about 1 per cent by weight and with silicon tetrafluoride which is present in an amount less than about 0.01 per cent by weight and in which components of a resulting hydrocarbon effluent are separated by fractional distillation under conditions such that said silicon tetrafluoride is hydrolyzed to form siliceous deposits by the condensation of a relatively low-boiling fraction from said fractional distillation, the method for removing said siliceous deposits which comprises introducing water directly into said relatively low-boiling fraction in an amount of about 1 to about 4 barrels of water per pound of silicon tetrafluoride present therein, maintaining the pH of said water within a range of about 6 to about 10 prior to introduction into said fraction, and withdrawing water containing siliceous deposits therein.

5. In a process involving the conversion of hydrocarbons in the presence of a fluorine-containing catalyst in which organic fluorine compounds formed during said conversion are separated from a hydrocarbon conversion effluent by passing said effluent through a contact material containing minor proportions of silica under conditions such that silicon tetrafluoride in an amount not greater than about 0.01 per cent by weight contaminates a resulting effluent, the method of removing said silicon tetrafluoride from said effluent which comprises introducing water directly into said effluent in an amount of about 1 to about 4 barrels of water per pound of silicon tetrafluoride, and withdrawing water containing hydrolysis products of said silicon tetrafluoride.

6. In a process involving the conversion of hydrocarbons in the presence of a fluorine-containing catalyst in which a liquid hydrocarbon conversion effluent is contacted with an organic fluorine-removing material containing minor proportions of silica and thereby is contaminated with water which is present in an amount less than about 1 per cent by weight and with silicon tetrafluoride which is present in an amount less than about 0.01 per cent by weight and in which components of a resulting hydrocarbon effluent are separated by fractional distillation under conditions such that said silicon tetrafluoride is hydrolyzed to form siliceous deposits by the condensation of a relatively low-boiling fraction from said fractional distillation, the method for removing said siliceous deposits which comprises introducing an aqueous basic solution directly into said relatively low-boiling fraction in an amount of about 1 to about 4 barrels of aqueous basic solution per pound of silicon tetrafluoride present therein, maintaining the pH of said aqueous basic solution within a range of about 6 to about 10 prior to introduction into said fraction, and withdrawing an aqueous solution containing siliceous deposits therein.

7. In a process involving the conversion of hydrocarbons in the presence of a fluorine-containing catalyst in which a liquid hydrocarbon conversion effluent is contacted with an organic fluorine-removing material containing minor proportions of silica and thereby is contaminated with water which is present in an amount less than about 1 per cent by weight and with silicon tetrafluoride which is present in an amount less than about 0.01 per cent by weight and in which components of a resulting hydrocarbon effluent are separated by fractional distillation under conditions such that said silicon tetrafluoride is hydrolyzed to form siliceous deposits by the condensation of a relatively low-boiling fraction from said fractional distillation, the method for removing said siliceous deposits which comprises introducing water directly into said relatively low-boiling fraction in an amount of about 1 to about 4 barrels of water per pound of silicon tetrafluoride present therein, and withdrawing water containing siliceous deposits therein.

8. In a process involving the conversion of hydrocarbons in the presence of a fluorine-containing catalyst in which a liquid hydrocarbon conversion effluent is contacted with an organic fluorine-removing material containing minor proportions of silica and thereby is contaminated with water and with silicon tetrafluoride and in which components of a resulting hydrocarbon effluent are separated by fractional distillation under conditions such that said silicon tetrafluoride is hydrolyzed to form siliceous deposits by the condensation of a relatively low-boiling fraction from said fractional distillation, the method for removing said siliceous deposits which comprises introducing water directly into said relatively low-boiling fraction in an amount of about 1 to about 4 barrels of water per pound of silicon tetrafluoride present therein, and withdrawing water containing siliceous deposits therein.

9. In a process involving the conversion of hydrocarbons in the presence of a fluorine-containing catalyst in which a hydrocarbon conversion effluent is contacted with an organic fluorine-removing material containing minor proportions of silica and thereby is contaminated with water and with silicon tetrafluoride and in which components of a resulting hydrocarbon effluent are separated by fractional distillation under conditions such that said silicon tetrafluoride is hydrolyzed to form siliceous deposits by the condensation of a relatively low-boiling fraction from said fractional distillation, the method for removing said siliceous deposits which comprises introducing an aqueous basic solution directly into said relatively low-boiling fraction in an amount of about 1 to about 4 barrels of aqueous basic solution per pound of silicon tetrafluoride present therein, and withdrawing aqueous solution containing siliceous deposits therein.

10. In a process involving the alkylation of isobutane in the presence of a hydrofluoric acid alkylation catalyst in which a liquid hydrocarbon conversion effluent is contacted with bauxite containing less than about 20 weight per cent silica to remove organic fluorine compounds formed during said conversion and is thereby contaminated with water and with silicon tetrafluoride and in which a resulting effluent is fractionally distilled under conditions such that silicon tetrafluoride is hydrolyzed to form siliceous deposits by condensation of an overhead fraction from said fractional distillation, the method for removing said siliceous deposits which comprises injecting water directly into said overhead fraction during said condensation in amounts of about 1 to about 4 barrels of water per pound of silicon tetrafluoride present therein, and withdrawing water therefrom containing siliceous deposits.

RALPH C. COLE.

REFERENCES CITED

The following references are of record in the file of this patent:

UNITED STATES PATENTS

| Number | Name | Date |
|---|---|---|
| 2,347,945 | Frey | May 2, 1944 |
| 2,322,800 | Frey | June 29, 1943 |
| 2,317,901 | Frey | Apr. 27, 1943 |